(12) United States Patent
Perisho et al.

(10) Patent No.: US 11,608,721 B2
(45) Date of Patent: Mar. 21, 2023

(54) MOTOR DRIVE SHAFT SPRING CLUTCH IN ELECTRICAL SUBMERSIBLE PUMP

(71) Applicant: Baker Hughes Oilfield Operations LLC, Houston, TX (US)

(72) Inventors: Randal Perisho, Tulsa, OK (US); Zheng Ye, Claremore, OK (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 30 days.

(21) Appl. No.: 17/307,986

(22) Filed: May 4, 2021

(65) Prior Publication Data
US 2021/0348488 A1  Nov. 11, 2021

Related U.S. Application Data

(60) Provisional application No. 63/020,839, filed on May 6, 2020.

(51) Int. Cl.
*E21B 43/12* (2006.01)
*F04D 13/10* (2006.01)
(Continued)

(52) U.S. Cl.
CPC ............ *E21B 43/128* (2013.01); *F04D 13/10* (2013.01); *F04D 29/044* (2013.01); *F04D 29/106* (2013.01); *F16D 41/206* (2013.01); *H02K 5/132* (2013.01); *H02K 7/108* (2013.01); *F16D 1/10* (2013.01); *F16D 2001/103* (2013.01)

(58) Field of Classification Search
CPC ...... E21B 43/128; F04D 13/10; F04D 29/044; F04D 29/106; F04D 13/022; F16D 41/206; F16D 1/10; F16D 2001/103; H02K 5/132; H02K 7/108; F05D 2260/52
See application file for complete search history.

(56) References Cited

U.S. PATENT DOCUMENTS 2,838,938 A * 6/1958 Sacchini ................. F02N 15/04
123/179.26
2,895,578 A * 7/1959 Winchell .............. F16D 41/206
192/72
(Continued)

FOREIGN PATENT DOCUMENTS

EP            0153079 A1   8/1985
WO       2010030272 A1   3/2010

OTHER PUBLICATIONS

International Search Report and Written Opinion of PCT Application No. PCT/US2021/070513 dated Aug. 12, 2021: pp. 1-9.
(Continued)

*Primary Examiner* — Dominick L Plakkoottam
(74) *Attorney, Agent, or Firm* — Bracewell LLP; Keith R. Derrington

(57) ABSTRACT

An electrical submersible well pump assembly has shaft couplings. One of the couplings has a lower hub that rotates in unison with the motor shaft and an upper hub that rotates in unison with the pump shaft. A helical spring clutch engages both hubs when the motor shaft is being driven by the motor. Ceasing driving rotation of the motor shaft causes the spring clutch to disengage from the upper hub, enabling the pump shaft to rotate the upper hub without rotating the lower hub.

20 Claims, 4 Drawing Sheets

(51) Int. Cl.
*F04D 29/044* (2006.01)
*F04D 29/10* (2006.01)
*F16D 41/20* (2006.01)
*H02K 5/132* (2006.01)
*H02K 7/108* (2006.01)
*F16D 1/10* (2006.01)

(56) References Cited

U.S. PATENT DOCUMENTS

| | | | | |
|---|---|---|---|---|
| 4,262,786 | A * | 4/1981 | Taylor | F16D 41/12 192/48.92 |
| 4,763,764 | A * | 8/1988 | Smith | F16D 43/18 192/72 |
| 5,350,242 | A | 9/1994 | Wenzel | |
| 10,323,644 | B1 * | 6/2019 | Shakirov | F04D 13/10 |
| 2002/0056602 | A1 | 5/2002 | Aurora | |
| 2007/0068163 | A1 * | 3/2007 | Ishikawa | B63H 21/20 60/700 |
| 2008/0108442 | A1 * | 5/2008 | Jansen | F16D 7/022 464/54 |
| 2009/0202371 | A1 * | 8/2009 | Green | F04C 13/008 417/423.3 |
| 2009/0291003 | A1 * | 11/2009 | Brown | E21B 4/006 417/410.3 |
| 2011/0171047 | A1 | 7/2011 | Parmeter et al. | |
| 2013/0101447 | A1 * | 4/2013 | Brown | F04B 17/03 29/888.02 |
| 2015/0275581 | A1 | 10/2015 | Agarwal et al. | |
| 2015/0285365 | A1 * | 10/2015 | Canto Michelotti | F16D 3/72 474/94 |
| 2017/0234321 | A1 * | 8/2017 | Meyer | F04D 13/10 415/1 |
| 2017/0306731 | A1 * | 10/2017 | Xiao | F04B 47/06 |
| 2020/0063541 | A1 | 2/2020 | Davis | |
| 2020/0166088 | A1 * | 5/2020 | Leonov | E21B 43/128 |

OTHER PUBLICATIONS

International Search Report and Written Opinion for related PCT application PCT/US2019/037602 dated Oct. 2, 2019: pp. 1-9.
U.S. Appl. No. 17/233,207, "Shear Pin and Drive Shaft Spring Brake in Electrical Submersible Pump", filed Apr. 16, 2021.

* cited by examiner

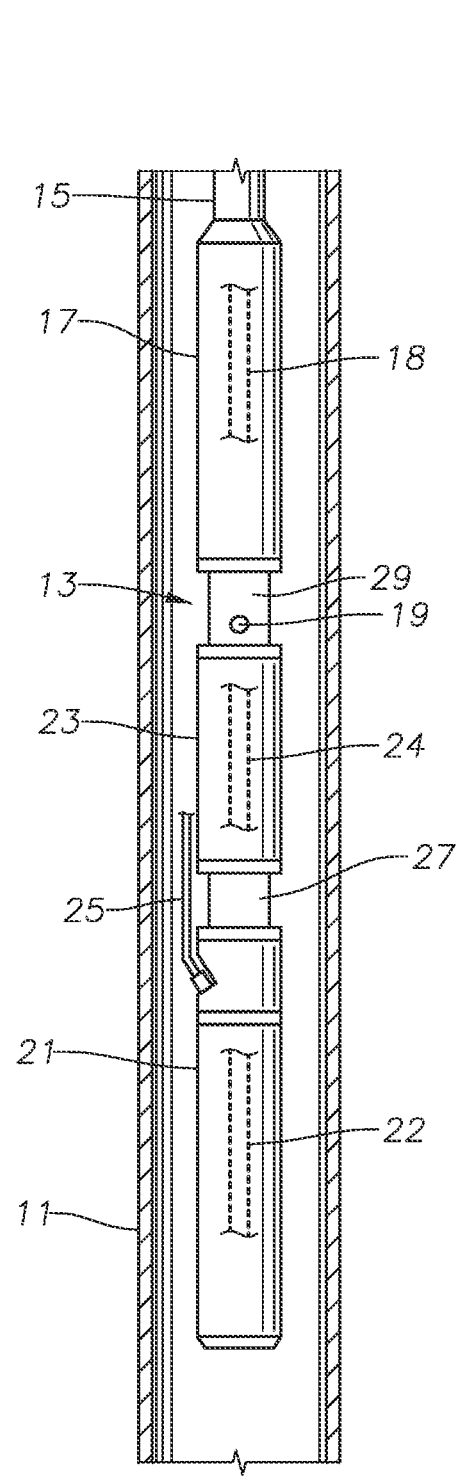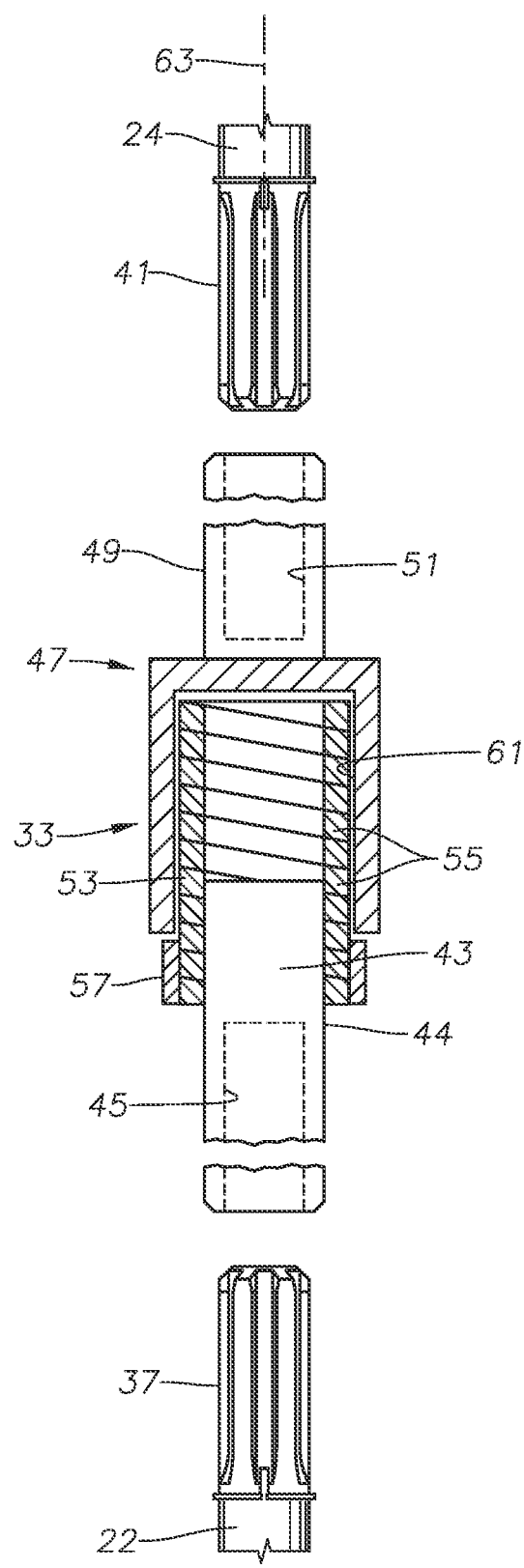
FIG. 1
FIG. 2

MOTOR DRIVE SHAFT SPRING CLUTCH IN ELECTRICAL SUBMERSIBLE PUMP

CROSS-REFERENCE TO RELATED APPLICATION

This application claims priority to provisional application Ser. No. 63/020,839, filed May 6, 2020.

FIELD OF THE DISCLOSURE

This disclosure relates in general to electrical submersible well pumps (ESP), and in particular to a clutch mechanism that prevents spinning of the motor drive shaft unless power is being supplied to the motor.

BACKGROUND

ESPs are commonly used in hydrocarbon producing wells. A typical ESP includes an electrical motor having a rotating drive shaft that drives the pump. The pump may be a centrifugal pump or another type. The motor is typically a three-phase AC motor of an induction electric type, but permanent magnet motors are also employed.

There are occasions when well fluid flows through the pump while the motor is not being powered. The flowing well fluid through the pump can cause the motor shaft to spin, which can generate an electrical charge, particularly if the motor is a permanent magnet type. The electrical charge can be dangerous to nearby technicians. One instance can occur when the ESP is being run into the well on production tubing. Well fluid can flow up through the pump, resulting in forward spinning of the motor shaft. Technicians normally deploy a power cable at the same time and strap the power cable onto the production tubing every 20 feet or so. The terminals at the upper end of the power cable could be exposed and electrocute the technician.

Another instance occurs upon retrieval with production tubing. Technicians at the wellhead will be stopping the upward pull every 20 feet or so to remove the straps of the power cable to the tubing. Well fluid previously in the pump and production tubing can drain out the pump intake, causing the pump to reverse spin. The reverse spinning of the pump causes reverse spinning of the motor shaft, which can also generate an electrical charge. The electrical charge could be present on the terminals of the power cable, which may be disconnected from the power supply during retrieval.

In addition, when the ESP is shut down, the column of well fluid in the tubing can flow downward through the pump, causing reverse spinning of the motor shaft. The reverse spinning motor shaft can generate an electrical charge.

Helical spring brakes are known to be used on helicopter shafts and washing machine shafts for various purposes. However, helical spring brakes have not been configured and mounted to ESP shaft assemblies.

SUMMARY

An electrical submersible well pump assembly (ESP), comprises an electrical motor having a motor shaft. A seal section mounted to the motor has a seal section shaft coupled to the motor shaft with a motor/seal section coupling. A pump mounted to the seal section has a pump shaft coupled to the seal section shaft with a seal section/pump coupling. One of the couplings comprises motor end and pump end hubs aligned with each other on a longitudinal axis of the ESP. A helical spring clutch with motor end helical turns engages the motor end hub. Pump end helical turns of the spring engage the pump end hub. The motor end and pump end helical turns and the motor end and pump end hubs are configured to rotate the pump end hub with the motor end hub only when the motor is driving the motor shaft and the motor end hub. The configuration allows free rotation of the pump end hub relative to the motor end hub when the pump shaft is driving the pump end hub and the motor is not driving the motor shaft.

In one embodiment, said one of the couplings comprises the motor/seal section coupling. In that embodiment, the motor/seal section coupling is immersed in a dielectric lubricant that is in fluid communication with dielectric lubricant in the motor.

In the embodiments shown, the pump end hub has a pump end hub receptacle with an open end and a cylindrical inward facing pump end hub sidewall. The pump end helical turns are within the pump end hub receptacle and extend in a helical direction that causes the pump end helical turns to increase in diameter into gripping engagement with the pump end hub sidewall in response to the motor driving the motor shaft and the motor end hub. The pump end helical turns are out of gripping engagement with the pump end hub sidewall when the pump shaft is driving the pump end hub.

The motor end helical turns may be secured to the motor end hub for rotation with the motor shaft. In one embodiment, the motor end hub comprises a rod having a cylindrical outward facing sidewall. The motor end helical turns extend around the rod, and a clamp clamps the motor end helical turns to the rod.

In one example, the spring clutch has a closed motor end; and the ESP further comprises a threaded screw mounted to the closed motor end of the spring clutch that secures into a threaded hole in the motor end hub.

In one embodiment, the motor end hub has a motor end receptacle with an open end and a cylindrical inward facing motor end hub sidewall. The motor end helical turns are within the motor end receptacle and extend in a helical direction that causes the motor end helical turns to increase in diameter into gripping engagement with the motor end hub sidewall in response to the motor driving the motor shaft and the motor end hub. In the embodiment shown, the pump end helical turns extend in a helical direction that is opposite to the motor end helical turns.

In the embodiments shown, the pump end hub has an open motor end and a cylindrical inward facing pump end hub sidewall. The pump end helical turns are within the pump end hub and extend in a helical direction that causes the pump end helical turns to increase in diameter into gripping engagement with the pump end hub sidewall in response to the motor driving the motor shaft and the motor end hub. The pump end helical turns are out of gripping engagement with the pump end hub sidewall when the pump shaft is driving the pump end hub. In one embodiment, the motor end hub comprises a rod having a cylindrical outward facing sidewall. The motor end helical turns extend around the motor end hub in a helical direction that causes the motor end helical turns to enter gripping engagement with the rod in response to the motor driving the motor shaft and the motor end hub.

In one example, the motor end hub further comprises an annular flange extending outward from the rod below the motor end helical turns. The pump end hub has a motor end that surrounds the motor end helical turns and contacts the flange at an interface. The interface comprises a bearing.

BRIEF DESCRIPTION OF THE DRAWINGS

FIG. 1 is a side view an ESP supported on tubing, the ESP being in accordance with this disclosure.

FIG. 2 is a schematic sectional and exploded view of the coupling between the seal section shaft and motor shaft of FIG. 1, the coupling being shown in a position when the motor is not powered.

DETAILED DESCRIPTION OF THE DISCLOSURE

Figure 4:
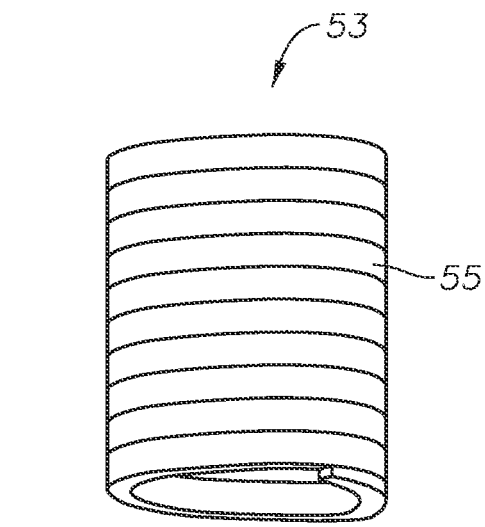
FIG. 4 is a perspective view of the spring clutch of the coupling of FIG. 2, shown removed from the coupling.

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude. The terms "upper", "lower" and the like are used only for convenience as the ESP may be operated in positions other than vertical.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, the well has casing 11 cemented in place. In this embodiment, a wellhead (not shown) at the surface supports an electrical submersible pump (ESP) 13 on a string of production tubing 15. ESP 13 includes a pump 17, which is illustrated to be a centrifugal pump with a large number of pump stages, each stage having a rotatable impeller and a non-rotating diffuser. Other types of pumps are feasible, such as positive displacement pumps. Pump 17 has a rotationally driven pump shaft 18 and intake port 19 for drawing in well fluid from casing 11 and discharging the well fluid into production tubing 15. A rotary gas separator (not shown) could be mounted to the lower end of pump 17 for separating gas from liquid in the well fluid flowing into pump 17. If so, pump intake port 19 would be in the gas separator and the drive shaft within the gas separator may be considered to be a lower extension of pump shaft 18.

A motor 21 with a motor shaft 22 drives pump shaft 18 of pump 17. Motor 21 is typically a three-phase electrical motor filled with a dielectric lubricant. Motor 21 may be a permanent magnet motor having a rotor containing permanent magnets that rotate in response to electromagnetic fields of a non-rotating stator.

A seal section 23 connected between motor 21 and pump 17 has a pressure equalizer that reduces a pressure differential between the lubricant in motor 21 and well fluid on the exterior. Alternately, the pressure equalizer could be mounted below motor 21. Seal section 23 has a seal section shaft 24 that drives pump shaft 18 and is driven by motor shaft 22. A power cable 25 with a motor lead extension on its lower end extends downward from the wellhead alongside production tubing 15 to a receptacle on an upper portion of motor 21 for powering motor 21.

Rather than production tubing 15, ESP 13 could be supported on a string of coiled tubing, which is a continuous steel tube deployed from a reel at the surface. ESP coiled tubing has a power cable inside rather than on the exterior. In that instance, motor 21 and seal section 23 would be above pump 17, and pump 17 would discharge into an annulus surrounding motor 21.

In the FIG. 1 embodiment, a first or lower connector 27 connects motor 21 to seal section 23, and a second or upper connector 29 connects seal section 23 to pump 17. If a rotary gas separator is employed, second connector 29 would connect seal section 23 to the gas separator. A third connector would connect the gas separator to the pump.

Referring to FIG. 2, a clutch coupling 33 will be located within one of the connectors 27, 29, and in this example, clutch coupling 33 is a motor/seal section coupling located in first connector 27. Motor shaft 22 has a splined upper end 37 in engagement with a lower portion of clutch coupling 33. Seal section shaft 24 has a lower splined end 41 that is engagement with an upper portion of clutch coupling 33. A conventional coupling (not shown) will connect seal section shaft 24 to pump shaft 18 in this example.

When motor 21 is powered to drive motor shaft 22, clutch coupling 33 transfers the driving rotation of motor shaft 22 to seal section shaft 24, which in turn transfers the driving rotation to pump shaft 18. Even if motor 21 is not powered, pump shaft 18 can rotate in a normal driving direction while ESP 13 is being lowered into casing 11 during installation due to well fluid flowing upward through pump intake ports 19. Also, after installation if motor 21 shuts down, well fluid flowing back down tubing 15 can flow downward through pump 17 and out intake ports 19, causing pump shaft 18 to spin in reverse. Further, upon retrieval, at times well fluid can drain out of pump 17, causing reverse spinning of pump shaft 18. When motor 21 is not driving motor shaft 22, clutch coupling 33 prevents pump shaft 18 from rotating motor shaft 22 in either the normal driving direction or the reverse direction.

In this embodiment, by locating clutch coupling 33 in first connector 27, it will be immersed in and lubricated by dielectric motor lubricant of motor 21. Alternately, clutch coupling 33 could be located within second connector 29, however it would be immersed and lubricated by well fluid, rather than motor lubricant.

In this example, clutch coupling 33 has a lower or motor end hub 43 with an integrally formed adapter 44 on its lower end. Adapter 44 has an internally splined socket 45 that receives splined upper end 37 of motor shaft 22. Other types of connections are feasible, including making adapter 44 and lower hub 43 an integral part of motor shaft 22. Lower hub 43 is a cylindrical rod, stub shaft, or pedestal in this embodiment. Clutch coupling 33 has an upper or pump end hub 47 with an adapter 49 having an internally splined socket 51 facing upward for receiving the lower splined end 41 of seal section shaft 24.

Clutch coupling 33 has a helical coiled clutch spring 53 comprising helical turns 55 extending from the lower or motor end to the upper or pump end. Both the lower and upper ends of helical turns 55 are free prior to installation in clutch coupling 33.

Figure 3:
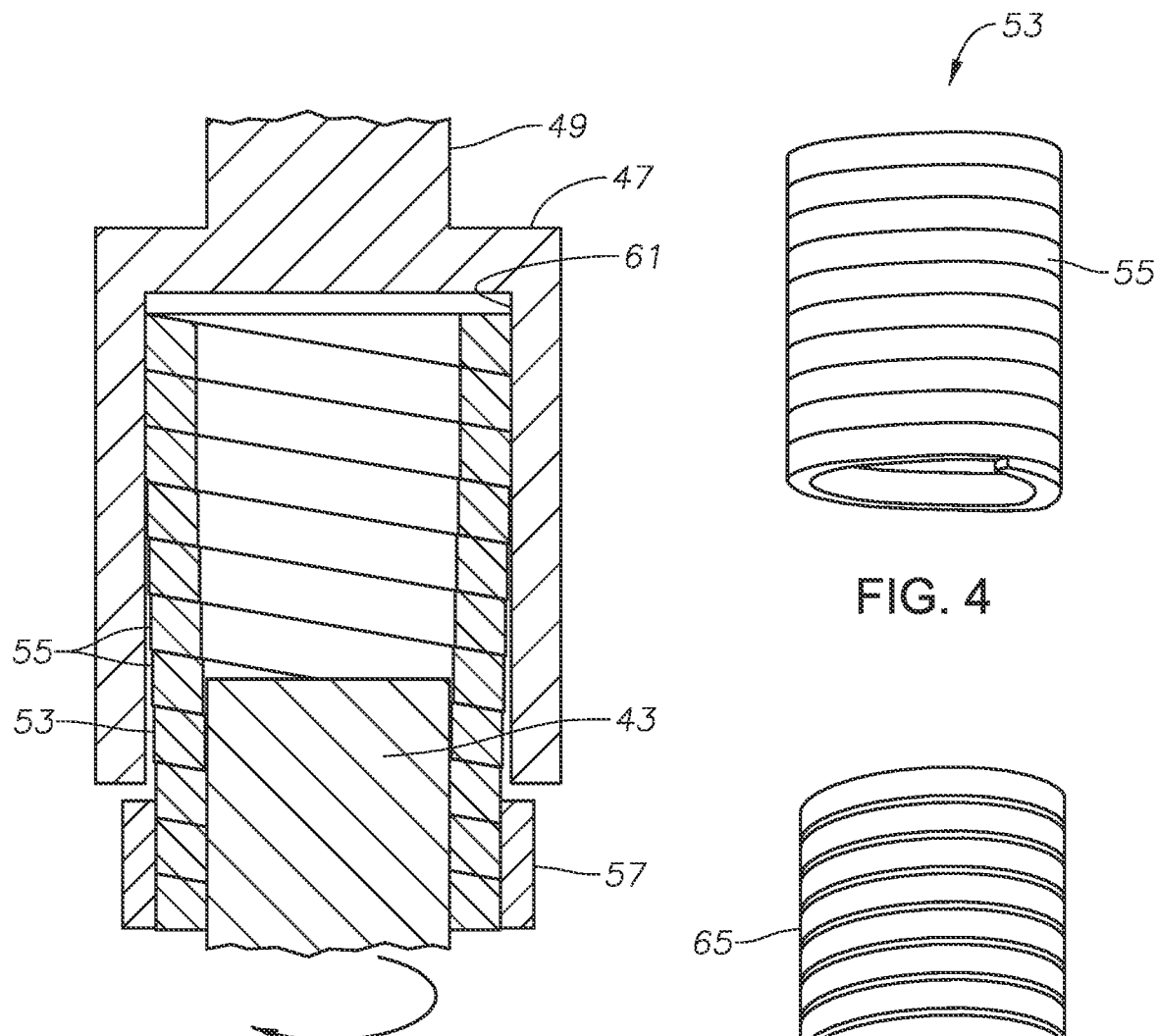
FIG. 3 is a schematic sectional view of the coupling of FIG. 2 while the motor is powered.

Clutch spring 53, shown also in FIG. 4, may be manufactured by making a helical cut through the wall of a tubular block of metal. When viewed in an axial cross-section, as shown in FIG. 3, each helical turn 55 has a rectangular shape in this example. When looking downward from the upper end, helical turns 55 define a counterclockwise helical path extending in the opposite direction from the driving direction of motor shaft 22. The normal driving direction of motor shaft 22 in these embodiments is clockwise, but it could be reversed.

The lower end of clutch spring 53 is fixed to lower hub 43 for rotation therewith in this embodiment. One technique for securing clutch spring 53 to lower hub 43 employs a shrink ring or clamp 57 that clamps the lower portion of clutch spring 55 tightly around lower hub 43. Shrink ring 57 may be a solid annular member that employs a thermal process to cause it to shrink in diameter so that it can be first inserted over lower hub 43, then shrunk to tightly clamp the lower end of clutch spring 53 to lower hub 43. For example, shrink ring 57 may be a shape memory alloy such as Nitinol that shrinks when heat is applied and retains the smaller diameter after the heat is removed. Shrink ring 57 clamps only the lower portion of helical turns 55, and the remaining turns 55 may retain their original diameter.

In this embodiment, upper hub 47 is a receptacle with an open lower end. Upper hub 47 has an inner cylindrical sidewall 61 that faces inward toward longitudinal axis 63 of clutch coupling 33. The upper portion of clutch spring helical turns 55 fits within the receptacle defined by upper hub 47. Initially, the upper portion of helical turns 55 are spaced radially inward from upper hub sidewall 61 by a slight clearance; or they could be lightly touching. The touching contact would only be a few degrees of contact of helical turns 55 due to manufacturing tolerances. In this example, no complete 360 degree turn of clutch spring 53 initially contacts sidewall 61.

Referring to FIG. 3, when motor shaft 22 (FIG. 1) drives lower hub 43 as indicated by the arrow, clutch spring 53 will rotate in unison. The upper portion of helical turns 55 expand radially outward in response to the centrifugal force of the rotation, coming into tight gripping engagement with upper hub inner sidewall 61. The gripping engagement causes upper hub 47 to rotate in unison, driving seal section shaft 24 (FIG. 2) and pump shaft 18 (FIG. 1). The gripping engagement ceases once motor 21 stops driving motor shaft 22. The helical turns 55 within upper hub 47 will retract in diameter and lose the gripping engagement with sidewall 61 due to the loss of centrifugal force.

If pump shaft 18 (FIG. 1) starts to spin in the normal driving direction during initial installation while power to motor 21 is off, this driving direction rotation would cause rotation of seal section shaft 24 and upper hub 47, but not clutch spring 53 because of the clearance between helical turns 55 and upper hub sidewall 61. Similarly, if pump shaft 18 begins to spin in the reverse direction while power to motor 21 is off, upper hub 47 would also spin in the reverse direction but not clutch spring 53 because of the lack of gripping engagement with sidewall 61.

Figure 5:
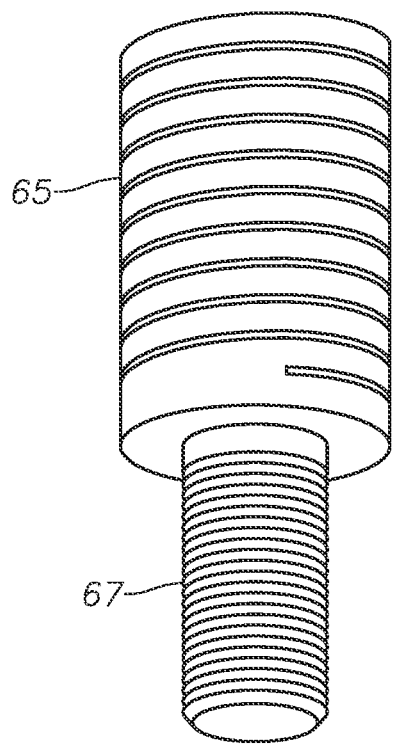
FIG. 5 is a perspective view of an alternate embodiment of the spring clutch of FIG. 4, shown removed from the coupling assembly.

FIG. 5 illustrates a spring clutch 65 as an alternate embodiment of spring clutch 53. Rather than shrink ring 57 (FIG. 2), a screw 67 depends from a closed lower end of spring clutch 65. Screw 67 engages a threaded hole in lower hub 43 to secure the lower portion of spring clutch 65 to lower hub 43 for rotation. The upper portion of spring clutch 65 would engage upper hub sidewall 61 (FIG. 2) in response to driving rotation of lower hub 43 in the same manner as described in connection with FIGS. 2-4. The threads of screw 67 are in a direction that tightens when motor shaft 22 turns.

Figure 6:
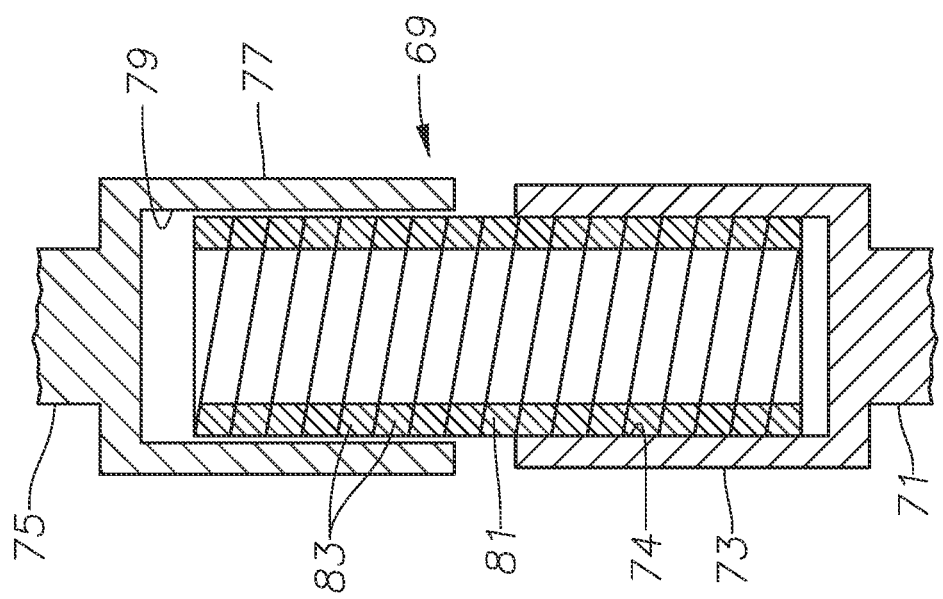
FIG. 6 is a schematic sectional view is an alternate embodiment of the coupling of FIG. 2.

In the alternate embodiment of FIG. 6, coupling 69 has a lower adapter 71 that may have a splined socket similar to socket 45 in FIG. 2. Lower hub 73 joins lower adapter 71 and comprises an upward facing receptacle with an open upper end and an inward-facing cylindrical sidewall 74. Upper adapter 75 and upper hub 77 may be the same as in FIG. 2-3. Upper hub 77 is a downward-facing receptacle with an inward-facing sidewall 79.

Clutch spring 81 may be the same as clutch spring 53 of FIG. 2. In this example, the lower portion of helical turns 83 will be in an initial frictional or interference engagement with sidewall 74 of lower hub 73. The upper portion of helical turns 83 will initially not be in gripping engagement with upper hub sidewall 79. Rather the upper portion of helical turns 83 will be spaced slightly from or lightly touching upper hub sidewall 79. The touching, if any, would only be a few degrees of contact between clutch spring 81 and upper hub sidewall 79 due to manufacturing tolerances. No complete 360 degree contact between clutch spring 81 and upper hub sidewall 79 occurs initially.

When motor 21 (FIG. 1) drives motor shaft 22, lower hub 73 will turn clutch spring 81 in unison because of the initial interference fit with lower hub sidewall 74. The driving direction rotation causes the lower portion of helical turns 83 to expand and more tightly grip lower hub sidewall 74. The driving direction rotation of lower hub 73 causes the diameter of the upper helical turns 83 to expand and commence gripping engagement with upper hub sidewall 79. The rotation transfers from upper hub 77 to pump shaft 18 (FIG. 1). Rotation of pump shaft 18 in either direction while motor power is off does not cause lower hub 73 to rotate for the same reasons as explained in connection with the first embodiment.

Figure 7:
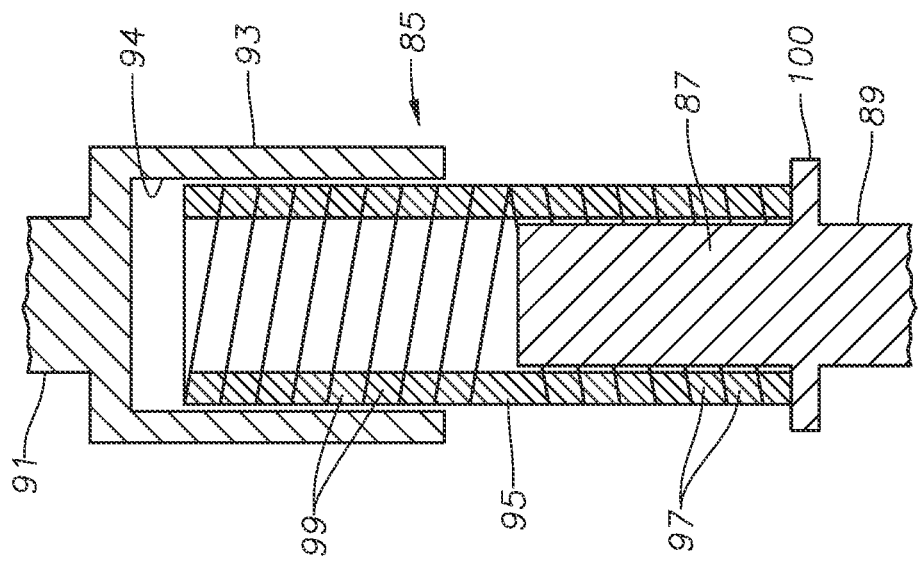
FIG. 7 is a schematic sectional view of another alternate embodiment of the coupling of FIG. 2.

In the embodiment of FIG. 7, clutch coupling 85 has a lower hub 87 that is a cylindrical rod, similar to lower hub 43 in FIG. 2. A lower adapter 89 with a splined socket depends downward from lower hub 87 and may be integral with it. An upper adapter 91 and an upper hub 93 having an inward-facing sidewall 94 may be constructed as in FIG. 2 or FIG. 7. Upper hub 93 is also a receptacle with an inward-facing sidewall 94.

In this example, clutch spring 95 differs from clutch spring 53 (FIG. 2) in that it has lower helical turns 97 that turn or extend in the opposite direction to upper helical turns 99. Lower helical turns 97 extend in the same direction as the direction of rotation of motor shaft 22 (FIG. 1) when motor 21 is powered. Lower helical turns 97 are inserted over lower hub 87 with an initial interference. Rotation of lower hub 87 by motor shaft 22 causes lower helical turns 97 to contract and more tightly grip lower hub 87. Upper helical turns 99 are initially spaced from gripping engagement with upper hub sidewall 94. The driving direction rotation of clutch spring 95 causes upper helical turns 99 to expand into tight gripping engagement with upper hub sidewall 94.

Figure 8:
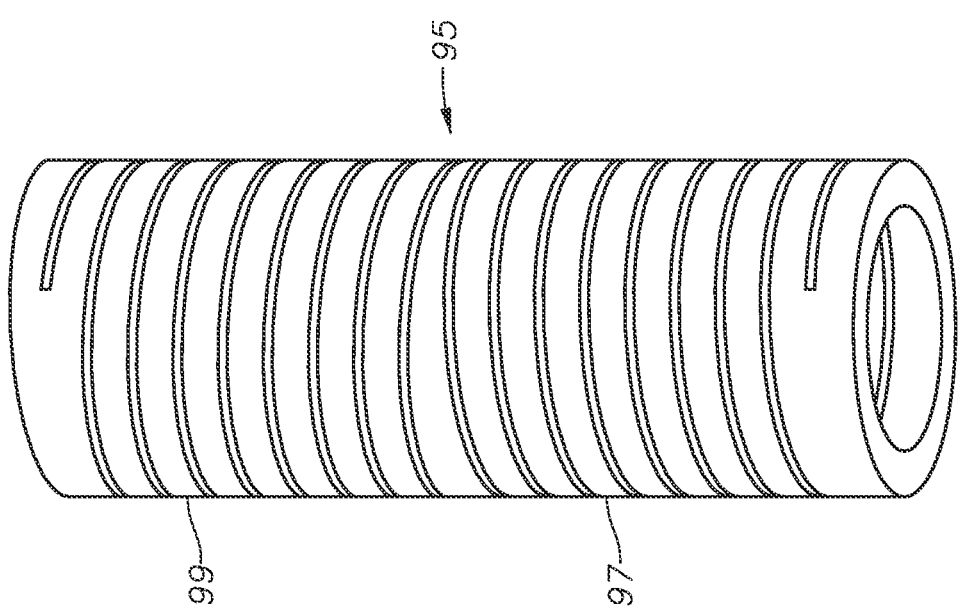
FIG. 8 is a perspective view of the spring clutch of the coupling of FIG. 7, shown removed from the coupling.

Lower adapter 89 may have an outer flange 100, and the lower end of clutch spring 95 may abut flange 100. FIG. 8 is a pictorial representation of clutch spring 95.

Figure 9:
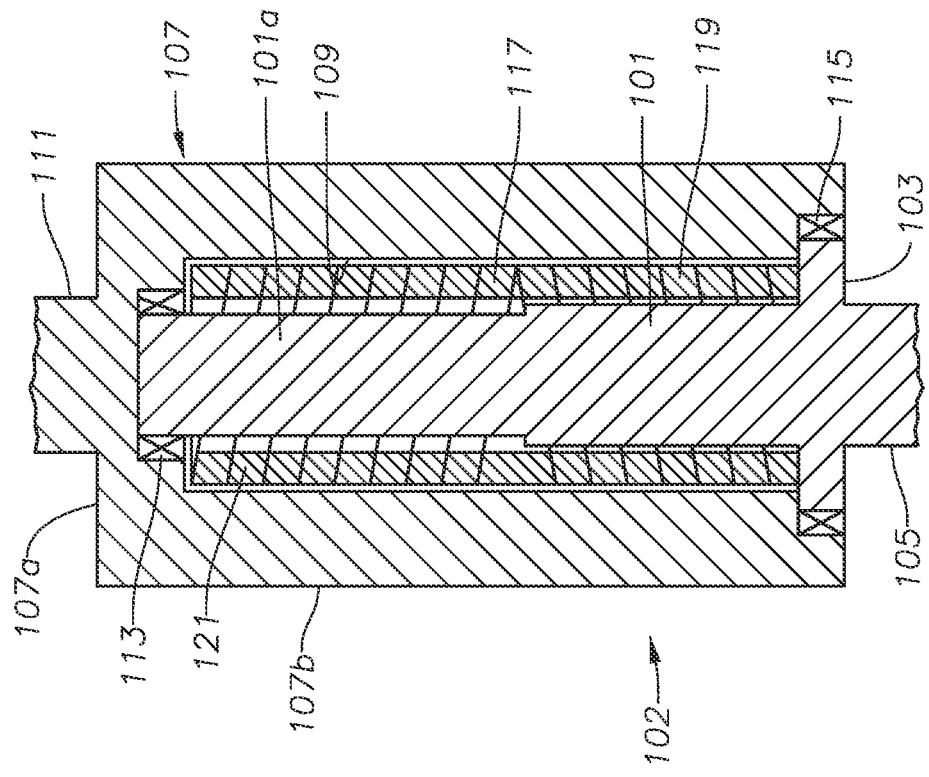
FIG. 9 is a schematic sectional view of another alternate embodiment of the coupling of FIG. 2.

Clutch coupling 102 in FIG. 9 is another embodiment. It has a lower hub 101 that is a rod or pedestal with a cylindrical exterior. Lower hub 101 has an upper extension 101a that is also a rod and may be smaller in outer diameter than lower hub 101. A lower adapter 105 joins lower hub 101 and has a socket for receiving motor shaft splined end 37 (FIG. 2). Lower adapter 105 has an external flange 103. Lower hub 101, flange 103, lower adapter 105, and upper extension 101a are secured and rotate together.

Upper hub 107 is a receptacle having a closed upper end 107a and a cylindrical wall 107b with an inward-facing sidewall 109. Upper end 107a and cylindrical wall 107b are secured to each other and rotate together. An upper adapter 111 joins and is secured to closed upper end 107a of upper hub 107. Upper adapter 111 has a splined socket for receiving seal section shaft lower splined end 41 (FIG. 2). Lower hub extension 101a extends upward in upper hub 107 and may be in abutment with upper closed end 107a. However, upper closed end 107a is rotatable relative to lower hub extension 101a when pump shaft 18 (FIG. 1) is rotating and motor shaft 22 not rotating. Bearings 113 are shown schematically at the interface of the top of lower hub extension 101a and closed upper end 107a to facilitate rotation of upper closed end 107a relative to lower hub extension 101a. Upper hub cylindrical wall 107b extends down into an interface with lower hub flange 103. Bearings 115 are located at this interface for improved alignment and performance. Bearings 115 enable rotation of upper hub cylindrical wall 107b relative to lower hub flange 103 when pump shaft 18 (FIG. 1) is rotating and motor shaft 22 not rotating.

Clutch spring 117 may be constructed the same as clutch spring 95 of FIG. 7. Clutch spring 117 has lower helical turns 119 that encircle lower hub 101 with an initial interference fit. The outer diameter of lower helical turns 119 is separated from upper hub inward-facing sidewall 109 by a clearance. Clutch spring 117 has upper helical turns 121 that extend helically in an opposite direction to lower helical turns 119 in this example. Upper helical turns 121 may have the same inner and outer diameters as lower helical turns 119. However, the inner diameter of upper helical turns 121 is separated from lower hub extension 101a by an annular clearance because of the smaller outer diameter of lower hub extension 101a than lower hub 101. The outer diameter of upper helical turns 121 may initially be spaced a slight distance from upper hub sidewall 109 as in the other embodiments.

When motor shaft 22 (FIG. 1) is being driven by motor 21, clutch spring 117 rotates in the same direction, causing lower helical turns 119 to contract and more tightly grip lower hub 101. Upper helical turns 121 expand into gripping engagement with upper hub sidewall 109, causing upper hub 107 to rotate in unison with lower hub 101. When motor 21 is off, and pump shaft 18 (FIG. 1) begins to spin in either direction, upper hub 107 will rotate in unison. However, clutch spring 117 does not rotate because upper helical turns 121 will have retracted in diameter enough to lose gripping engagement with upper hub sidewall 109 once motor shaft 22 stops driving. As a result, lower hub 101 and motor shaft 22 do not turn. Bearings 113 and 115 facilitate the rotation of upper hub 107 relative to lower hub 101. An alternate embodiment (not shown) using alignment bearings similar to bearings 113 and 115 could employ shrink ring 57 and clutch spring 53 (FIG. 3) instead.

The present invention described herein, therefore, is well adapted to carry out the objects and attain the ends and advantages mentioned, as well as others inherent therein. While only a few embodiments of the invention have been given for purposes of disclosure, numerous changes exist in the details of procedures for accomplishing the desired results. These and other similar modifications will readily suggest themselves to those skilled in the art, and are intended to be encompassed by the scope of the claims. For example the spring clutch could be mounted in the coupling between the seal section shaft 24 and the pump shaft 18 instead of between the motor shaft 22 and seal section shaft 24.

The invention claimed is:

1. An electrical submersible well pump assembly (ESP), comprising:
   an electrical motor having a motor shaft;
   a seal section mounted to the motor and having a seal section shaft coupled to the motor shaft with a motor/seal section coupling;
   a pump mounted to the seal section and having a pump shaft coupled to the seal section shaft with a seal section/pump coupling;
   one of the couplings comprising:
   motor end and pump end hubs aligned with each other on a longitudinal axis of the ESP;
   a helical spring clutch with motor end helical turns that engage the motor end hub and pump end helical turns that engage the pump end hub; and
   the motor end and pump end helical turns and the motor end and pump end hubs being configured to rotate the pump end hub with the motor end hub only when the motor is driving the motor shaft and the motor end hub, and to allow free rotation of the pump end hub relative to the motor end hub when the pump shaft is driving the pump end hub and the motor is not driving the motor shaft.

2. The ESP according to claim 1, wherein:
   said one of the couplings comprises the motor/seal section coupling; and
   the motor/seal section coupling is immersed in a dielectric lubricant that is in fluid communication with dielectric lubricant in the motor.

3. The ESP according to claim 1, wherein
   the pump end hub has a pump end hub receptacle with an open end and a cylindrical inward facing pump end hub sidewall;
   the pump end helical turns are within the pump end hub receptacle and extend in a helical direction that causes the pump end helical turns to increase in diameter into gripping engagement with the pump end hub sidewall in response to the motor driving the motor shaft and the motor end hub; and
   the pump end helical turns are out of gripping engagement with the pump end hub sidewall when the pump shaft is driving the pump end hub.

4. The ESP according to claim 3, wherein
   the motor end helical turns are secured to the motor end hub for rotation therewith.

5. The ESP according to claim 4, wherein:
   the motor end hub comprises a rod having a cylindrical outward facing sidewall;
   the motor end helical turns extend around the rod; and
   a clamp clamps the motor end helical turns to the rod.

6. The ESP according to claim 4, wherein:
   the spring clutch has a closed motor end; and the ESP further comprises:

a threaded screw mounted to the closed motor end of the spring clutch that secures into a threaded hole in the motor end hub.

7. The ESP according to claim 3, wherein:
the motor end hub has a motor end receptacle with an open end and a cylindrical inward facing motor end hub sidewall;
the motor end helical turns are within the motor end receptacle and extend in a helical direction that causes the motor end helical turns to increase in diameter into gripping engagement with the motor end hub sidewall in response to the motor driving the motor shaft and the motor end hub.

8. The ESP according to claim 7, wherein:
the pump end helical turns extend in a helical direction that is the same as the motor end helical turns.

9. The ESP according to claim 1, wherein
the pump end hub has an open motor end and a cylindrical inward facing pump end hub sidewall;
the pump end helical turns are within the pump end hub and extend in a helical direction that causes the pump end helical turns to increase in diameter into gripping engagement with the pump end hub sidewall in response to the motor driving the motor shaft and the motor end hub;
the pump end helical turns are out of gripping engagement with the pump end hub sidewall when the pump shaft is driving the pump end hub;
the motor end hub comprises a rod having a cylindrical outward facing sidewall; and
the motor end helical turns extend around the motor end hub in a helical direction that causes the motor end helical turns to enter gripping engagement with the rod in response to the motor driving the motor shaft and the motor end hub.

10. The ESP according to claim 9, wherein:
the motor end hub further comprises an annular flange extending outward from the rod below the motor end helical turns;
the pump end hub has a motor end that surrounds the motor end helical turns and contacts the flange at an interface; and
the interface comprises a bearing.

11. An electrical submersible well pump assembly (ESP), comprising:
an electrical motor having a motor shaft;
a seal section mounted above the motor and having a seal section shaft coupled to the motor shaft with a motor/seal section coupling;
a pump mounted above the seal section and having a pump shaft coupled to the seal section shaft with a seal section/pump coupling;
one of the couplings comprising:
a lower hub that rotates in unison with the motor shaft;
an upper hub that rotates in unison with the pump shaft, the upper hub having an upper hub receptacle with an inward-facing sidewall and an open lower end;
a helical spring clutch with lower helical turns that rotate with the lower hub when the motor shaft is being driven by the motor and upper helical turns within the upper hub receptacle; wherein
the upper helical turns are wound so as to expand into gripping engagement with the sidewall of the upper hub to rotate the pump shaft when the motor shaft is being driven and rotating the spring clutch; and
ceasing driving rotation of the motor shaft causes the upper helical turns to retract from gripping engagement with the inward-facing sidewall of the upper hub receptacle, enabling the pump shaft to rotate the upper hub without rotating the lower hub.

12. The ESP according to claim 11, wherein:
the lower hub comprises a rod having a cylindrical outward facing sidewall;
the lower helical turns extend around the rod; and
a clamp clamps the lower helical turns to the rod.

13. The ESP according to claim 11, wherein:
the lower hub comprises a rod having a cylindrical outward facing sidewall;
the lower helical turns extend around the rod; and
the lower helical turns extend in a direction opposite to the upper helical turns.

14. The ESP according to claim 11, wherein:
the spring clutch has a closed lower end; and the ESP further comprises:
a threaded screw mounted to the closed lower end of the spring clutch that secures into a threaded hole in the lower hub.

15. The ESP according to claim 11, wherein:
the lower hub has a lower hub receptacle with an open upper end, the lower hub receptacle having a cylindrical inward facing lower hub sidewall; and
the lower helical turns are within the lower hub receptacle and extend in a helical direction that causes the lower helical turns to expand into gripping engagement with the lower hub sidewall in response to the motor driving the motor shaft and the lower hub.

16. The ESP according to claim 15, wherein:
the upper helical turns extend in a helical direction that is the same as the lower helical turns.

17. The ESP according to claim 11, wherein:
the lower hub comprises a rod, the lower helical turns extending around the rod, and an annular flange extending outward from the rod below the lower helical turns;
the upper hub receptacle surrounds the upper helical turns and the lower helical turns and contacts the flange at an interface; and
the interface comprises a bearing.

18. The ESP according to claim 11, wherein:
the motor shaft has a splined upper end;
the seal section shaft has a splined lower end and a splined upper end;
the pump shaft has a splined lower end;
the lower hub has a splined socket for selectively receiving one of the splined upper ends; and
the upper hub has a splined socket for selectively receiving one of the splined lower ends.

19. An electrical submersible well pump assembly (ESP), comprising:
an electrical motor having a motor shaft with a splined upper end;
a seal section mounted above the motor and having a seal section shaft with splined upper and lower ends and coupled to the motor shaft with a motor/seal section coupling;
a pump mounted above the seal section and having a pump shaft with a splined lower end coupled to the seal section shaft with a seal section/pump coupling;
one of the couplings, comprising:
a lower hub having a splined socket that receives one of the splined upper ends and rotates in unison with the motor shaft, the lower hub having a lower hub receptacle with an inward-facing sidewall and an open upper end;

an upper hub having a splined socket that receives one of the splined lower ends and rotates in unison with the pump shaft, the upper hub having an upper hub receptacle with an inward-facing sidewall and an open lower end;

a helical spring clutch with lower helical turns within the lower hub receptacle, the lower helical turns being wound to cause the lower helical turns to move into gripping engagement with the inward-facing sidewall of the lower hub when the lower hub and the motor shaft are being driven by the motor;

the helical spring clutch having upper helical turns within the upper hub receptacle, the upper helical turns being wound so as to cause the upper helical turns to move into gripping engagement with the sidewall of the upper hub receptacle to rotate the pump shaft when the motor shaft is being driven; and wherein ceasing driving rotation of the motor shaft causes the upper helical turns to release from gripping engagement with the inward-facing sidewall of the upper hub receptacle, enabling the pump shaft to rotate the upper hub without rotating the lower hub.

20. The ESP according to claim 18, wherein:

said one of the couplings comprises the motor/seal section coupling; and the motor/seal section coupling is immersed in a dielectric lubricant that is in fluid communication with dielectric lubricant in the motor.

\* \* \* \* \*